United States Patent [19]
Chyi-Shiun

[11] Patent Number: 5,378,199
[45] Date of Patent: Jan. 3, 1995

[54] AUTOMATIC RETRIEVING STRUCTURE OF SLIDING TRANSMISSION DISK OF MOTORCYCLE AUTOMATIC TRANSMISSION

[75] Inventor: Day Chyi-Shiun, Jong her, Taiwan, Prov. of China

[73] Assignee: Tong Yuan Design & Development Co., Ltd., Taichung, Taiwan, Prov. of China

[21] Appl. No.: 192,293

[22] Filed: Feb. 4, 1994

[51] Int. Cl.$^6$ ............................................. F16H 55/00
[52] U.S. Cl. ......................................... 474/8; 474/46
[58] Field of Search ............................. 474/8, 11-13, 474/17, 18, 46, 69, 70

[56] References Cited
U.S. PATENT DOCUMENTS

| | | | |
|---|---|---|---|
| 3,948,111 | 4/1976 | Dittrich | 474/46 X |
| 4,061,047 | 12/1977 | Newhouse | 474/46 |
| 4,605,386 | 8/1986 | Harris | 474/8 |

Primary Examiner—Michael Powell Buiz
Attorney, Agent, or Firm—Pro-Techtor International

[57] ABSTRACT

The sliding transmission disk of a motorcycle automatic transmission is provided with a shaft sleeve having a spring seat. Located at the bottom of the spring seat is a receiving frame in which a compression spring and a turning and sliding member are disposed.

The turning and slding member serves to prevent the compression spring from being acted on by a twisting force of the sliding transmission disk, thereby enabling the compression spring to rebound effectively to stabilize the decelerating action as well as the braking action of the motorcycle. The drive belt of the motorcycle is enabled to retrieve with precision so as to permit the motorcycle to be accelerated again after the decelerating and the braking actions.

4 Claims, 7 Drawing Sheets

AUTOMATIC RETRIEVING STRUCTURE OF SLIDING TRANSMISSION DISK OF MOTORCYCLE AUTOMATIC TRANSMISSION

BACKGROUND OF THE INVENTION

The present invention relates generally to a motorcycle automatic transmission, and more particularly to an automatic retrieving structure of sliding transmission disk of the motorcycle automatic transmission.

A prior art motorcycle engine is generally composed of a starting device provided with a sliding drive disk 1, as shown in FIGS. 1-3. The rotation of the sliding drive disk 1 causes a plurality of rollers 3 to roll outwards in an arcuate manner in conjunciton with a drive disk 5 to control the speed of a drive belt 4 and the sliding interval of the sliding drive disk 1, so as to impart the driving power to the transmission device. Before the engine is started, the sliding drive disk 1 is located by a bevel plate 2 while the driving end of the drive belt 4 is retained on a drive disk wheel nave 6 located between the sliding drive disk 1 and the dvive disk 5. As shown in FIG. 4, the transmission end of the drive belt 4 is retained on the outer ring disk wall of the transmission disk 7 and the sliding transmission disk 8. The trasmission disk 7 has a transmission nave 71 while the sliding transmission disk 8 has a shaft sleeve 81 fitted over the transmission nave 71 for retaining the drive belt 4. As shown in FIG. 5, the shaft sleeve 81 of the sliding transmission disk 8 is provided with a spring seat 82 having at the bottom thereof a receiving frame 821 for disposing therein a compression spring 9 for forcing the sliding transmission disk 8 to be close to the transmission disk 7 so as to permit the transmission end of the drive belt 4 to be retained on the outer disk wall for preparing to actuate at a low speed and a high torsion. As a result, the starting device is able to actrate the transmision device at a low speed and a high torsion at such time when the engine is started. As the engine is accelerated, the sliding drive disk 1 is pushed gradually toward the drive disk 5 by the moment of inertia of the rollers 3 which are caused to move along an arcuate recess 11 toward the disk circumferential ring, thereby causing the driving end of the drive belt 4 to disengage the driving disk wheel nave 6 and to become retained gradually on the outer disk surfaces of the sliding drive disk 1 and the drive disk 5, as shown in FIGS. 3 and 6. As the interval between the sliding drive disk 1 and the drive disk 5 is shortened, the drive belt 4 is caused to move further close to the outer circumferential ring of the side disk surface in view of the fact that the transmission wheel nave 71 is provided with a protruded pin member 72, and that the shaft sleeve 81 of the sliding transmission disk 8 is provided with a pin slot 811 opposite in location to and engageable with the protruded pin member 72. In the meantime, the transmission end of the drive belt 4 is caused to cooperate with the dispplacement of the sliding drive disk 1 to enable the sliding transmission disk 8 to move in the same direction so as to compress the compression spring 9 for increasing the interval between the sliding transmission disk 8 and the transmission disk 7. As a result, the drive belt 4 is caused to move inwards toward the transmision wheel nave 71 for actuating at a high speed. As the speed of the motorcycle is reduced, the sliding transmission disk 8 is caused to move toward the transission disk 7 by the rebounding tension of the compression spring 9 so as to cause the transmission end of the drive belt 4 to disengage the transmission wheel nave 71 to move toward the outer disk wall. In the meantime, the transmission end is caused to move toward the drive disk wheel nave 6, thereby causing the rollers 3 to retrieve in preparing for the motorcycle to accelerate again.

On the basis of the description presented above, it is readily apparent that the acelerated motion of the motorcycle is dependent on the rebounding tension of the compression spring 9, and that the accelerated motion of the motorcycle is bound to fail if the response of the rebounding tension of the compression spring 9 is poor, or if the magnitude of the rebounding tension of the compression spring 9 is inadequate.

As shown in FIG. 7, various component parts and the compression spring 9 of the prior art motorcycle are packed together. As a result, the interval between the sliding transmission disk 8 and the transmission disk 7 is gradually increased as the motorcycle is accelerated gradually, thereby resulting in a greater compression of the compression spring 9. Therefore, the compression spring 9 is vulnerable to failure in providing an effective rebounding tension after the motorcycle is decelerated or braked.

SUMMARY OF THE INVENTION

It is therefore the primary objective of the present invention to provide a motorcycle automatic transmission with a transmission disk having a transmission wheel nave, and with a sliding transmission disk having a shaft sleeve combined with the transmission wheel nave. The transmission disk transmission wheel nave is provided with a protruded pin member engageable with a pin slot of the shaft sleeve of the sliding transmission disk. The shaft sleeve is provided with a spring seat to accommodate a compression spring which is disposed in a receiving frame of the spring seat provided with a truning and sliding member capable of preventing the compression spring from being overcompressed at the time when a change in the interval between the sliding transmission disk and the transmission disk is taking place.

It is another objective of the present invention to provide the turning and sliding member of the spring seat with a steel ball serving to prevent the orvercompression of the compression spring and to enable the compression spring to respond axially and effectively to provide an adequate rebounding tension.

It is still another objective of the present invention to provide the receiving frame of the spring seat with a turning and sliding member comprising a base in contact with the receiving frame and a rotating seat for preventing the compression spring from being interfered with by the twisting motion potential of the sliding transmission disk.

It is still another objective of the present invention to provide the receiving frame of the spring seat with a turning and sliding member, which comprises an inner seat, a receiving seat, and a washer of an oily material and located between the inner seat and the receiving seaat for counteracting the twisting motion potential of the sliding transmission disk so as to prevent the compression spring from being overcompressed.

DETAILED DESCRIPTION OF THE INVENTION

Figure 1:
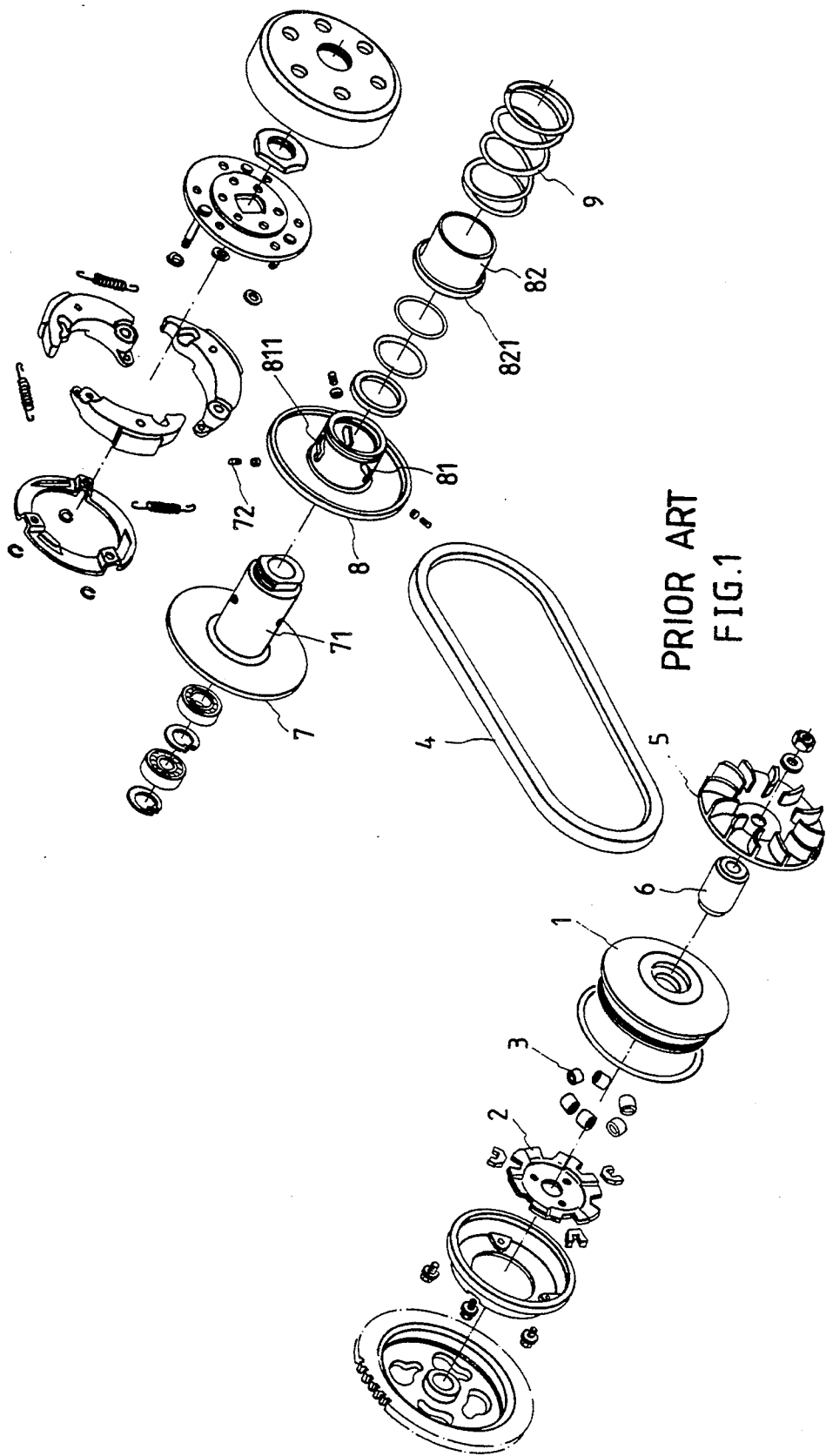
FIG. 1 shows an exploded view of an automatic transmission starting device and transmission device of a prior art motorcycle.
Figure 2:
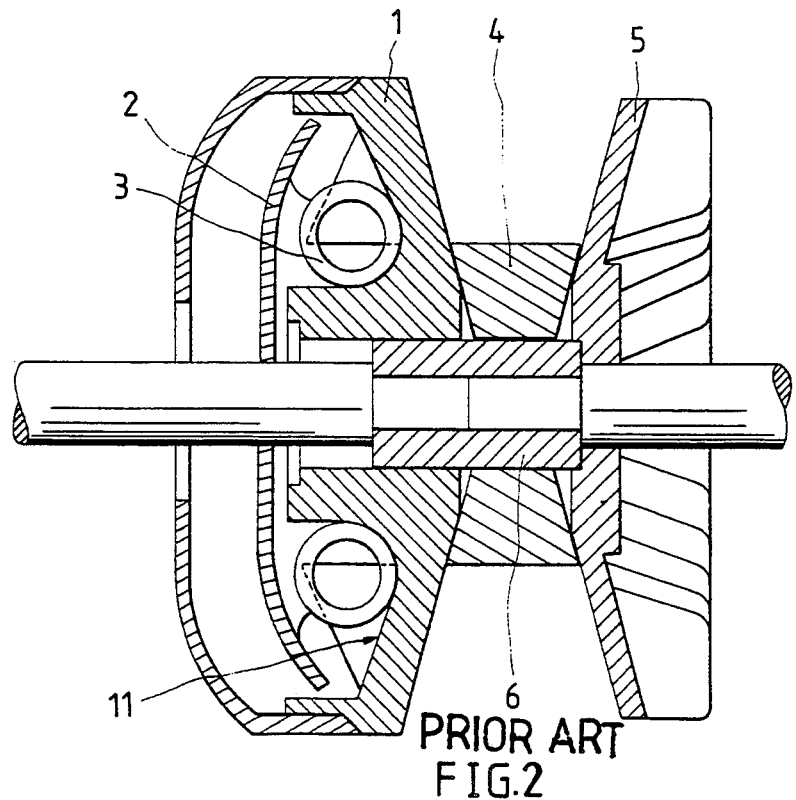
FIG. 2 shows a schematic view of the pre-starting condition of a prior art motorcycle automatic transmission starting device.
Figure 3:
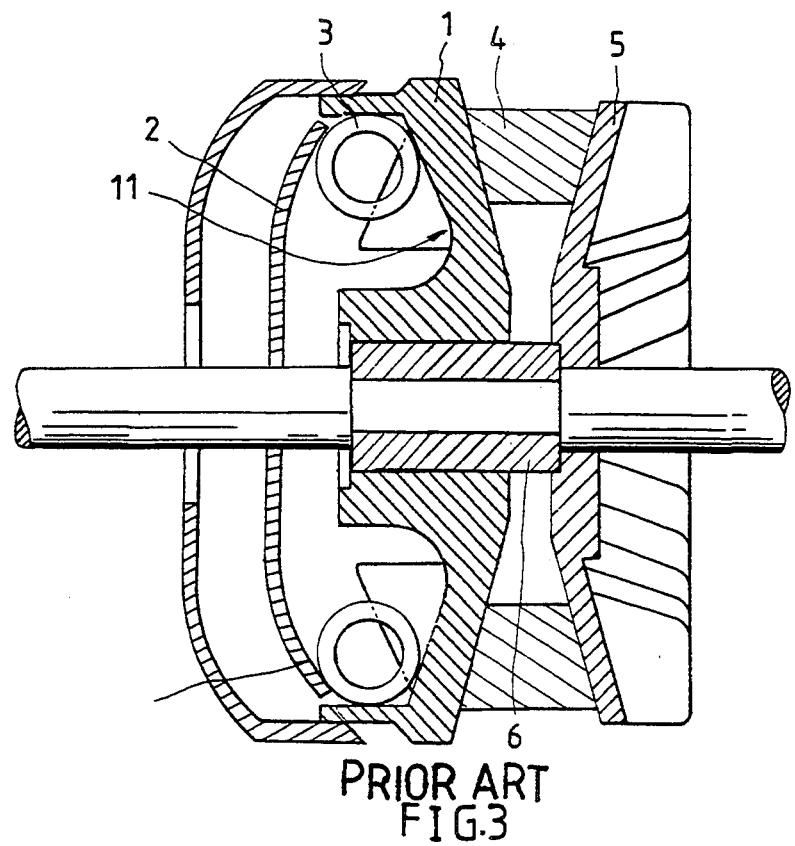
FIG. 3 shows a schematic view of the post-starting comdition of the prior art motorcycle automatic transmission starting device.
Figure 4:
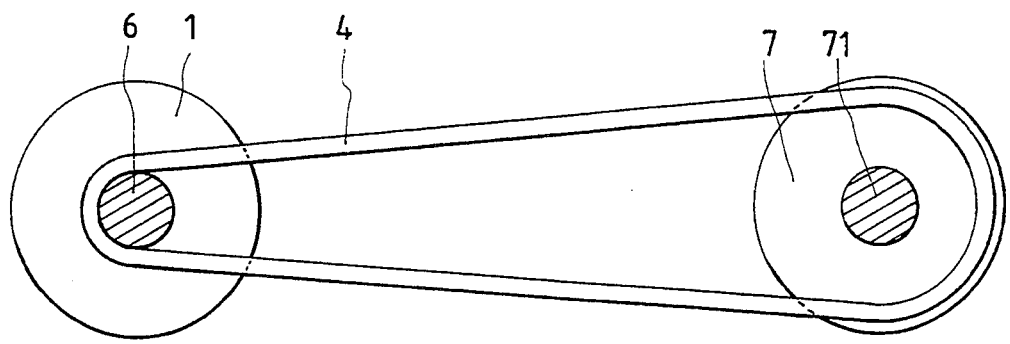
FIG. 4 shows a schematic view of the pre-starting condition of a prior art motorcycle automatic transmission starting device and transmission device.
Figure 5:
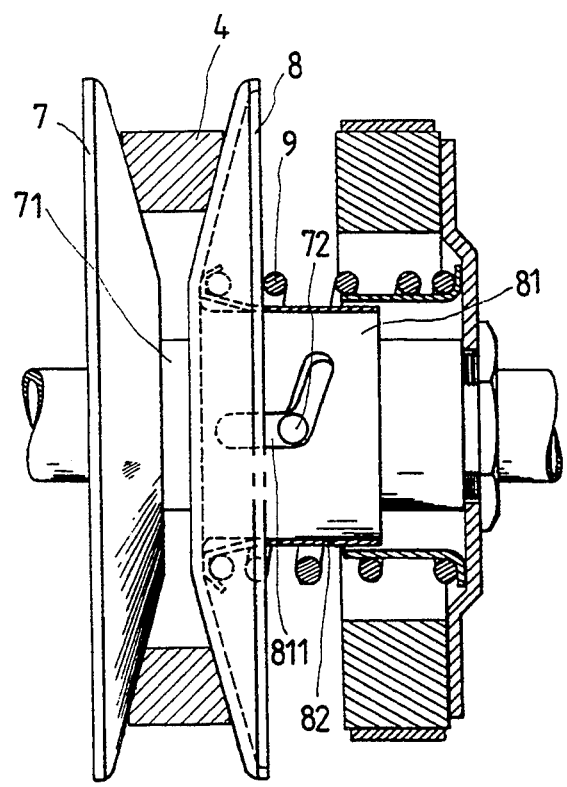
FIG. 5 shows a schematic view of the pre-starting condition of a prior art motorcycle automatic transmission device.
Figure 6:
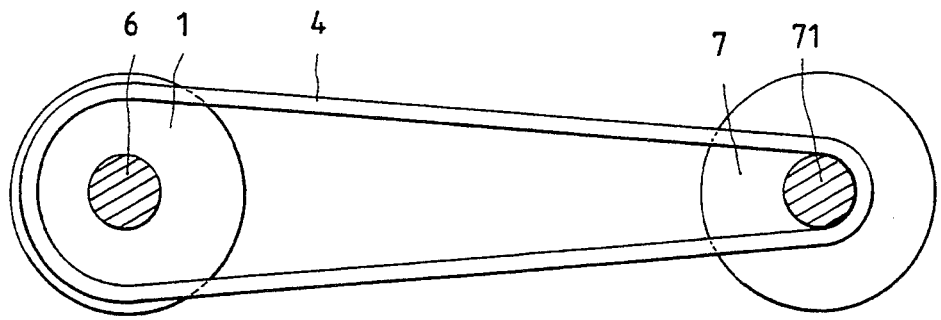
FIG. 6 shows a schematic view of the post-starting comdition of a prior art motorcycle automatic transmission starting device.
Figure 7:
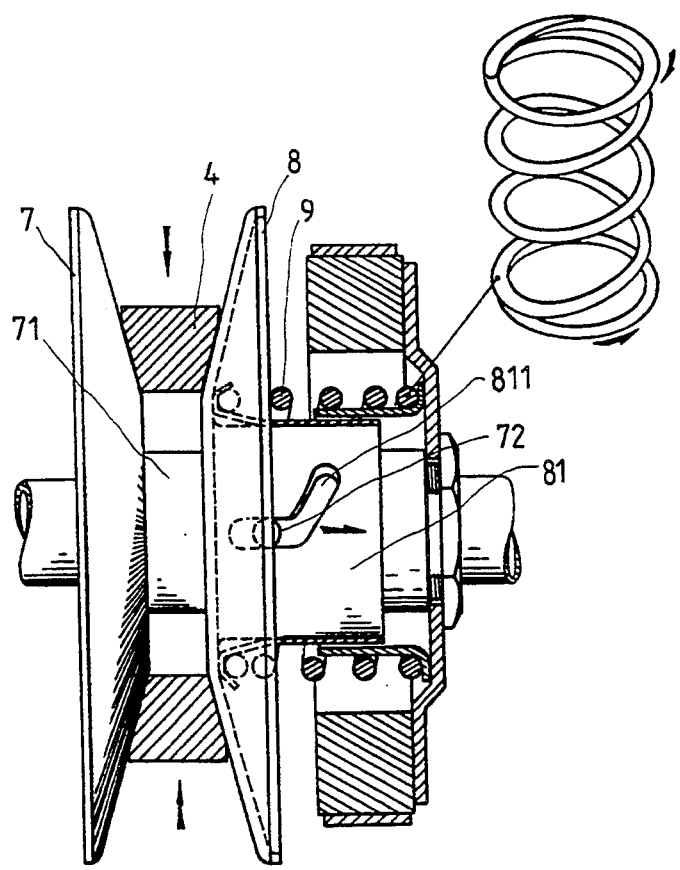
FIG. 7 shows a schematic view of the post-starting condition of a prior art motorcycle automatic transmission device.
Figure 8:
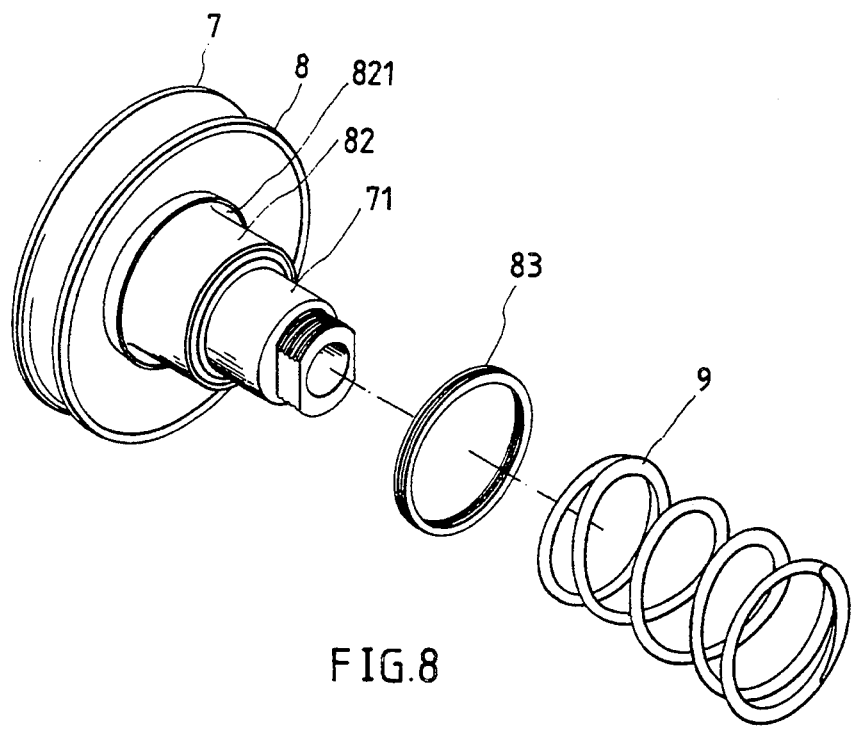
FIG. 8 shows an exploding view of the present invention.

As shown in FIG. 1, a transmission device of a motorcycle automatic transmission is provided with a transmission disk 7 having a transmission wheel nave 71 while a sliding transmission disk 8 has a shaft sleeve 81 combined with the transmission wheel nave 71, which is provided with a protruded pin member 72 opposite in location to and engageable with a pin slot 811 of the shaft sleee 81 of the sliding transmission disk 8. The interval between the sliding transmission disk 8 and the transmission disk 7 can be so changed as to facilitate a change in a drive position of a drive belt 4. The shaft sleeve 81 of the sliding transmission disk 8 is provided with a spring seat 82 having at the bottom thereof a receiving frame 821 in which a compression spring 9 is disposed for use in forcing the sliding transmission disk 8 to move close to the transmission disk 7 and in causing the transmission end of the drive belt 4 to drive at a low speed and a high torsion. The present invention is characterized in that the receiving frame 821 of the spring seat 82 is provided with a turning and sliding member 83 located between the receiving frame 821 and the compression spring 9.

Figure 9:
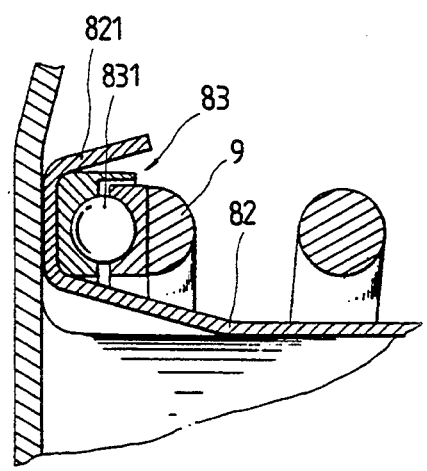
FIG. 9 shows a sectional view of a turning and sliding member of the present invention.
Figure 10:
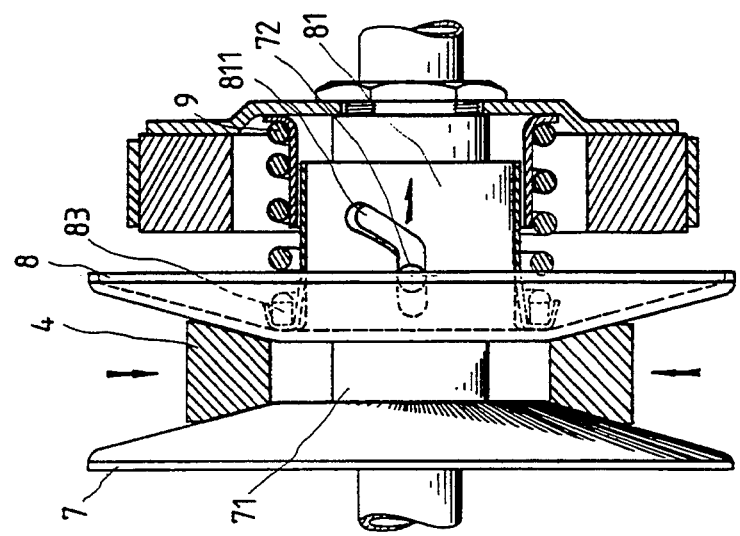
FIG. 10 shwos a schematic view of the turning and sliding member in action, according to the present invention.
Figure 11:
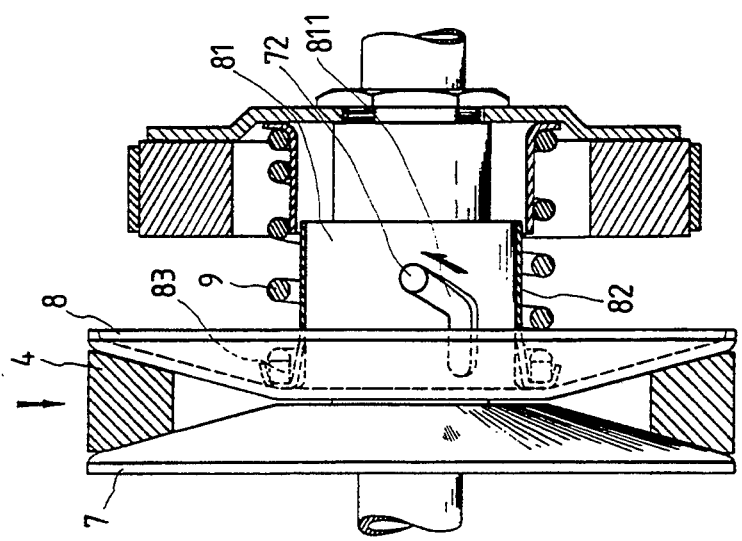
FIG. 11 shows another schematic view of the turning and sliding member in action, according to the present invention.

As shown in FIG. 9, the turning and sliding member 83 is provided with a steel ball 831 in contact with the receiving frame 821 of the spring seat 82 and with the compression spring 9. As the interval between the sliding transmission disk 8 and the transmission disk 7 is caused to change, the compression spring 9 is free from a twisting force acting thereon, thanks to the steel ball 831 of the turning and sliding member 83, as shown in FIGS. 10 and 11. As a result, the compression spring 9 is enabled to respond with an effective rebounding force for stabilizing the decelerating motion and the braking motion of the motorcycle. In other words, the drive belt 4 is therefore enabled to be ready to drive at an accelerated motion, thereby improving the perfermance of the motorcycle.

Figure 12:
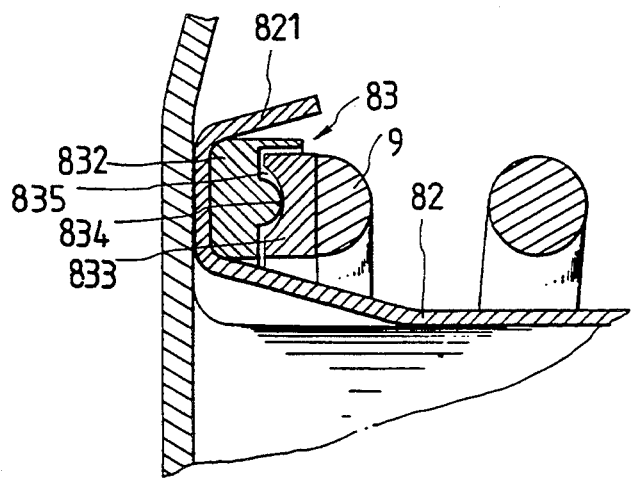
FIG. 12 shows another schematic view of the turning and sliding member in action, according to the present invention.
Figure 13:
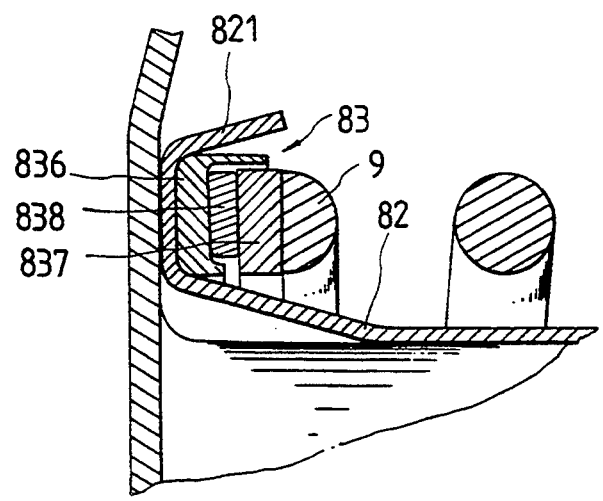
FIG. 13 shows another schematic view of the turning and sliding member in action, according to the present invention.

Now referring to FIG. 12, the turning and sliding member 83 of the present invention is shown to comprise a bottom seat 832 and a turning seat 833. The bottom seat 832 is provided with a protruded frame 834 while the turning seat 833 is provided with an annular slot 835 opposite in location to the protruded frame 834. The linear contact between the protruded frame 834 and the annular slot 835 causes the compression spring 9 to be free from a twisting force of the sliding transmission disk 8, thereby enabling the compression spring 9 to provide effectively an adequate rebounding force.

The turning and sliding member 83 embodied in the present invention may be further composed of a waser 838 of an oily material and located between an inner seat 836 and a receiving seat 837. The washer 838 is intended to counteract the influence of the twisting force of the sliding transmission disk 8 on the compression spring 9.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An automatic retrieving structure of a sliding transmission disk of a motorcycle automatic transmission comprising a transmission disk having a transmission wheel nave, and a sliding transmission disk having a shaft sleeve fitted over said transmission wheel nave which is provided with a protruded pin member opposite in location to and engageable with a pin slot disposed in said shaft sleeve of said sliding transmission disk for enabling an interval between said sliding transmission disk and said transmission disk to be changed in accordance with a constant rotational potential so as to facilitate the change in the driving position of a drive belt, said shaft sleeve of said sliding transmission disk further provided with a spring seat gaving at the bottom thereof a receiving frame in which a compression spring is disposed; wherein said receiving frame comprises a turning and sliding member capable of preventing said compression spring from being acted on by a twisting force of said sliding transmission disk at the time when said interval between said sliding transmission disk and said transmission disk is changed.

2. The automatic retrieving structure of the sliding transmission disk of a motorcycle automatic transmission in accordance with claim 1 wherein said turning and sliding member is of a steel-ball comstruction and capable of preventing said compression spring from being twisted and rotated by said twisting force of said sliding transmission disk.

3. The automatic retrieving structure of the sliding transmission disk of a motorcycle automatic transmission in accordance with claim 1 wherein said turning and sliding member comprises a bottom seat and a rotating seat, with said bottom seat being provided with a protruded and striped frame, and with said rotating seat being provided with an annular slot opposit in location to and engageable with said protruded and striped frame of said bottom seat; and wherein said compression spring is prevented form being acted on by said twisting force of said sliding transmission disk by virtue of a linear contact between said protruded and striped frame of said bottom seat and said annular slot of said rotating seat.

4. The automatic retrieving structure of the sliding transmission disk of a motorcycle automatic transmission in accordance with claim 1 wherein said turning and sliding member comprises an inner seat, a receiving seat, and a washer of an oily material and located between said inner seat and said receiving seat for counteracting said twisting force of said sliding transmission disk and for preventing said compression spring from being acted on by said twisting force of said sliding transmission disk.

* * * * *